United States Patent
Yeh

(10) Patent No.: US 7,729,235 B2
(45) Date of Patent: Jun. 1, 2010

(54) METHOD AND APPARATUS FOR OVSF CODE GENERATION

(75) Inventor: Yen-Hui Yeh, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 897 days.

(21) Appl. No.: 11/162,865

(22) Filed: Sep. 27, 2005

(65) Prior Publication Data

US 2007/0070876 A1    Mar. 29, 2007

(51) Int. Cl.
H04J 11/00    (2006.01)

(52) U.S. Cl. ............... 370/208; 370/320; 370/335; 370/342; 375/142; 375/150

(58) Field of Classification Search .......... 370/208, 370/320, 335, 342, 220; 375/142, 149–150, 375/343, 140, 146
See application file for complete search history.

(56) References Cited

U.S. PATENT DOCUMENTS

| 6,108,369 | A * | 8/2000 | Ovesjo et al. | 375/146 |
|---|---|---|---|---|
| 6,646,579 | B2 | 11/2003 | Doetsch et al. | |
| 6,721,299 | B1 * | 4/2004 | Song | 370/342 |
| 7,061,967 | B2 * | 6/2006 | Schelm et al. | 375/147 |
| 7,295,597 | B2 * | 11/2007 | Fitton et al. | 375/148 |
| 2002/0006156 | A1 * | 1/2002 | Belaiche | 375/130 |
| 2003/0108024 | A1 | 6/2003 | Kang | |
| 2003/0179699 | A1 | 9/2003 | Kim et al. | |
| 2003/0235238 | A1 * | 12/2003 | Schelm et al. | 375/148 |
| 2004/0091024 | A1 * | 5/2004 | Giancola | 375/148 |
| 2006/0245476 | A1 * | 11/2006 | Wang et al. | 375/148 |
| 2007/0064658 | A1 * | 3/2007 | Zou | 370/335 |
| 2007/0248148 | A1 * | 10/2007 | Dent | 375/145 |
| 2007/0258593 | A1 * | 11/2007 | Hepler | 380/268 |
| 2008/0285534 | A1 * | 11/2008 | Dent | 370/342 |

FOREIGN PATENT DOCUMENTS

| CN | 1349700 A | 5/2002 |
|---|---|---|
| CN | 1500335 A | 5/2004 |
| EP | 1 253 759 A1 | 10/2002 |
| TW | 494659 | 7/2002 |
| TW | 200304308 | 9/2003 |
| TW | 578407 | 3/2004 |
| TW | 200412093 | 7/2004 |
| TW | I221715 | 10/2004 |
| WO | WO 03/034628 A1 | 4/2003 |

* cited by examiner

*Primary Examiner*—William Trost, IV
*Assistant Examiner*—Roberta A Shand
(74) *Attorney, Agent, or Firm*—Winston Hsu

(57) ABSTRACT

Methods and apparatuses for generating an OVSF code are disclosed. A proposed method for generating a current code chip of an OVSF code includes: determining a correlation factor between the current code chip and a preceding code chip of the OVSF code; and generating the current code chip according to the preceding code chip and the correlation factor.

18 Claims, 6 Drawing Sheets

METHOD AND APPARATUS FOR OVSF CODE GENERATION

BACKGROUND

The present invention relates to spread spectrum systems, and more particularly, to methods and apparatuses for generating OVSF (orthogonal variable spreading factor) codes.

In spread spectrum systems, such as CDMA-2000 or UMTS (universal mobile telephone system), OVSF code is usually employed as the spreading code for use in both the spreading operations at the transmitter end and the de-spreading operations at the receiver end. The OVSF codes ensure orthogonality between different data channels in a multi-code transmission. The length of the OVSF code is called the spreading factor (SF). In different transmissions, different spreading factors may be adopted to accomplish the multi-rate transmission.

Please refer to FIG. 1, which shows a simplified structure of a conventional OVSF code tree 100. In FIG. 1, $C_{SF,x}$ denotes the OVSF code with a spreading factor $SF=2^k$, where x is the code index of the OVSF code and k is the layer number. In other words, $C_{SF,x}$ is the x-th OVSF code in the layer k where x=0, 1~SF−1. The mother codes of a specific OVSF code are the lower layer codes on the path from the specific OVSF code to the root code $C_{1,0}$, and the descendent codes are those produced from the specific OVSF code. For example, the mother codes of the OVSF code $C_{8,4}$ are codes $C_{4,2}$, $C_{2,1}$ and $C_{1,0}$, and the descendent codes of the OVSF code $C_{4,3}$ are codes $C_{8,6}$, $C_{8,7}$ and their descendent codes.

Any two OVSF codes at the same layer are orthogonal and any two OVSF codes at different layers are orthogonal except for the case that one of them is the mother code or the descendent code of another one. Two OVSF codes with different spreading factors are therefore not orthogonal when they are on the same branch of the code tree. When a specific OVSF code is assigned, its mother codes and descendent codes cannot be assigned in the same channel since they are not orthogonal to each other.

The OVSF codes are conventionally generated recursively from the code tree 100 as shown in FIG. 1. According to the related art, each of the OVSF codes in the code tree 100 must be held in a memory. This means that a memory of considerable capacity is required in order to hold all of the OVSF codes. In view of the foregoing, an efficient method for generating the required OVSF codes instead of maintaining the whole code tree in the memory is needed.

SUMMARY OF THE INVENTION

It is therefore an objective of the claimed invention to provide methods and apparatuses for generating OVSF codes to solve the above-mentioned problems.

An exemplary embodiment of a method for generating a current code chip of an OVSF code is disclosed comprising determining a correlation factor between the current code chip and a previous code chip of the OVSF code; and generating the current code chip according to the previous code chip and the correlation factor.

An exemplary embodiment of an OVSF code generator for generating a current code chip of an OVSF code is disclosed comprising a correlation factor decision device for determining a correlation factor between the current code chip and a previous code chip of the OVSF code; and a code chip generator coupled to the correlation factor decision device for generating the current code chip according to the previous code chip and said correlation factor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
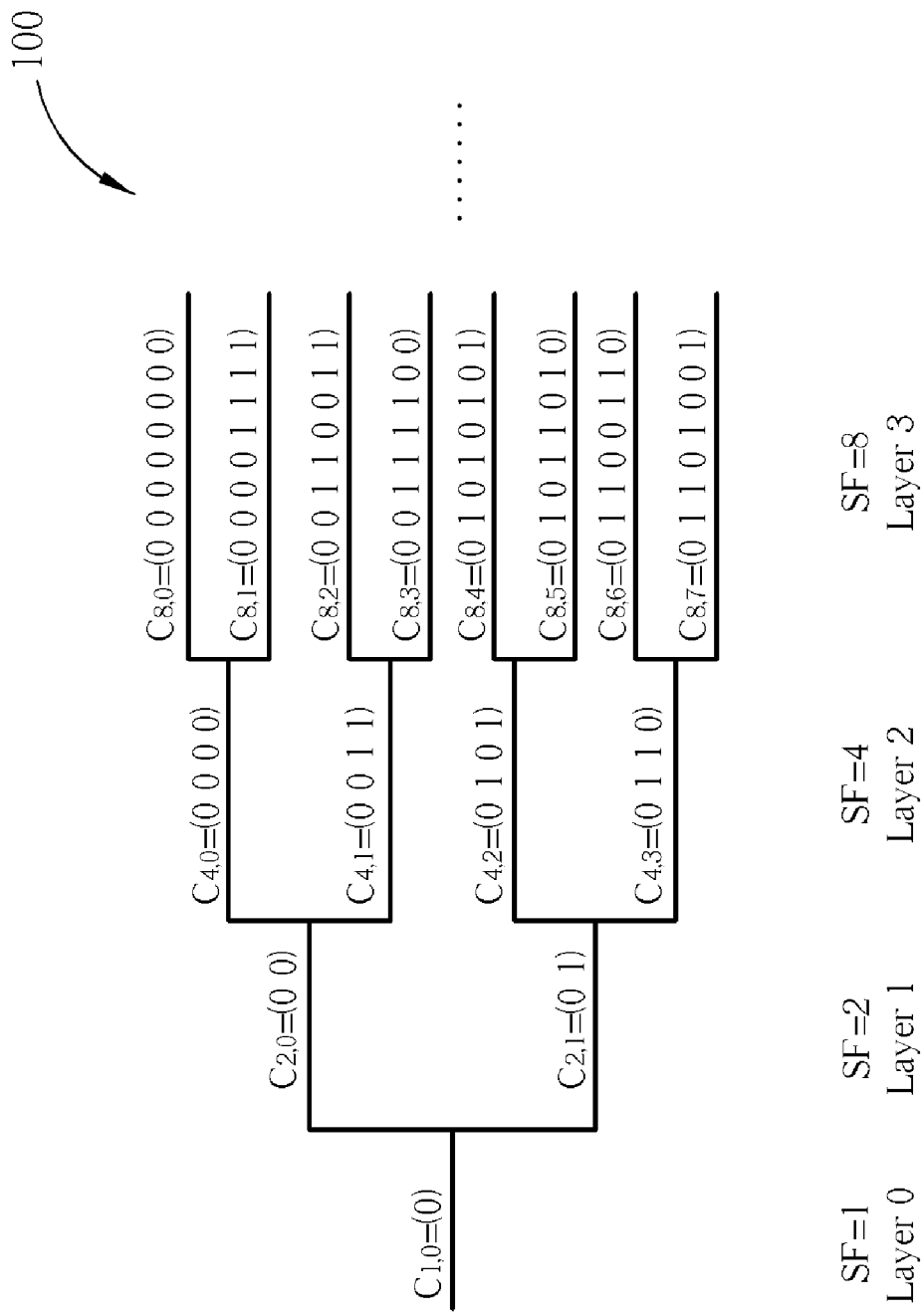
FIG. 1 is a simplified structure of a conventional OVSF code tree.

Certain terms are used throughout the description and following claims to refer to particular components. As one skilled in the art will appreciate, electronic equipment manufacturers may refer to a component by different names. This document does not intend to distinguish between components that differ in name but have the same function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

For the purpose of explanatory convenience in the following description, the code chip of an OVSF code $C_{SF,x}$ in the code tree 100 is defined as $M_{x,y,SF}$ where SF is the spreading factor, x is the code index of the OVSF code $C_{SF,x}$, and y is the chip number. In this embodiment, both the code index x and the chip number y range from 0, 1, . . . , SF−1. The code index x can be expressed in a binary form: $x=b_1 b_2 \ldots b_{k-1} b_k$, where SF equals to $2^k$. The chip number y indicates the position of the code chip $M_{x,y,SF}$ among code chips within the OVSF code $C_{SF,x}$, wherein $M_{x,0,SF}$ denotes the first code chip (i.e., the leftmost code chip) of the OVSF code $C_{SF,x}$, and $M_{x,SF-1,SF}$ denotes the last code chip (i.e., the rightmost code chip). For example, the four code chips (0101) of the OVSF code $C_{4,2}$, from left to right, can be expressed as $M_{2,0,4}$, $M_{2,1,4}$, $M_{2,2,4}$, and $M_{2,3,4}$, respectively.

The generation of the code chip $M_{x,y,SF}$ can be expressed as follows:

$$M_{x,y,SF} = (M_{x,y-1,SF} \oplus M_{x,y,SF}) \oplus M_{x,y-1,SF} \quad (1)$$
$$= \text{Cor}_{x,y,SF} \oplus M_{x,y-1,SF}$$
$$\text{for } y = 1, 2, \ldots, SF-1$$

where $\text{Cor}_{x,y,SF}$ represents a correlation factor between a current code chip $M_{x,y,SF}$ and a preceding code chip $M_{x,y-1,SF}$ of the OVSF code $C_{SF,x}$.

Note that the term "correlation factor" used herein indicates whether the current code chip $M_{x,y,SF}$ is the same as the preceding code chip $M_{x,y-1,SF}$. If, for example, the correlation factor $\text{Cor}_{x,y,SF}$ is 0, this means that the current code chip $M_{x,y,SF}$ is the same as the preceding code chip $M_{x,y-1,SF}$. On the contrary, if the correlation factor $\text{Cor}_{x,y,SF}$ is 1, this means that the current code chip $M_{x,y,SF}$ differs from the preceding code chip $M_{x,y-1,SF}$, e.g., the current code chip $M_{x,y,SF}$ is logically inverted from the preceding code chip $M_{x,y-1,SF}$ in this embodiment.

According to the structure of the OVSF code tree, the code chip $M_{x,0,SF}$ (i.e., the first code chip of the OVSF code $C_{SF,x}$) is always the same as the root code $C_{1,0}$. In other words, the code chip $M_{x,0,SF}$ is given. Therefore, as long as the correlation factor between adjacent code chips of an assigned OVSF code can be determined, the OVSF code can be generated chip-by-chip based on the equation (1). The method for determining the correlation factor between adjacent code chips will be further illustrated in the following paragraphs.

The correlation factor between a current code chip and a preceding code chip of an OVSF code can be determined based on the position of the current code chip among code chips within the OVSF code. As shown in FIG. 1, any OVSF code in the code tree 100, except the root code $C_{1,0}$, can be equally partitioned into two parts, the left half being identical to the mother code in the preceding layer and the right half being either identical to or an logically inverted copy of the mother code in the preceding layer. Accordingly, the correlation factor between code chips within the left half of the OVSF code $C_{SF,x}$ and the correlation factor between code chips within the right half of the OVSF code $C_{SF,x}$ are the same as the corresponding correlation factor in the mother code $C_{SF/2,[x/2]}$.

Taking the OVSF code $C_{8,3}$ (00111100) as an example, as shown in FIG. 1, the correlation factor $\text{Cor}_{3,1,8}$ between the code chips $M_{3,0,8}$ (0) and $M_{3,1,8}$ (0) and the correlation factor $\text{Cor}_{3,5,8}$ between the code chips $M_{3,4,8}$ (1) and $M_{3,5,8}$ (1) are the same as the correlation factor $\text{Cor}_{1,1,4}$ between the code chips $M_{1,0,4}$ (0) and $M_{1,1,4}$ (0) of the mother code $C_{4,1}$ (0011) of the OVSF code $C_{8,3}$. The correlation factor $\text{Cor}_{3,2,8}$ between the code chips $M_{3,1,8}$ (0) and $M_{3,2,8}$ (1) and the correlation factor $\text{Cor}_{3,6,8}$ between the code chips $M_{3,5,8}$ (1) and $M_{3,6,8}$ (0) are the same as the correlation factor $\text{Cor}_{1,2,4}$ between the code chips $M_{1,1,4}$ (0) and $M_{1,2,4}$ (1) of the mother code $C_{4,1}$. The correlation factor $\text{Cor}_{3,3,8}$ between the code chips $M_{3,2,8}$ (1) and $M_{3,3,8}$ (1) and the correlation factor $\text{Cor}_{3,7,8}$ between the code chips $M_{3,6,8}$ (0) and $M_{3,7,8}$ (0) are the same as the correlation factor $\text{Cor}_{1,3,4}$ between the code chips $M_{1,2,4}$ (1) and $M_{1,3,4}$ (1) of the mother code $C_{4,1}$.

Therefore, the correlation factor between adjacent code chips in the right half of the OVSF code $C_{SF,x}$ and the correlation factor between adjacent code chips in the left half of the OVSF code $C_{SF,x}$ can be replaced by the corresponding correlation factor of the mother code $C_{SF/2,[x/2]}$. In addition, the correlation factor $\text{Cor}_{x,SF/2,SF}$ between the two middle code chips of the OVSF code $C_{SF,x}$ can be determined by the least significant bit (LSB) $b_k$ of the code index x and the code chip $M_{[x/2],(SF/2)-1,SF/2}$ of the mother code $C_{SF/2,[X/2]}$. For example, the correlation factor $\text{Cor}_{3,4,8}$ between the two middle code chips $M_{3,3,8}$ and $M_{3,4,8}$ can be determined by performing an XOR operation on the least significant bit $b_k$ (=1) of the code index x (=3) of the OVSF code $C_{8,3}$ and the last code chip $M_{1,3,4}$ (=1) of the mother code $C_{4,1}$.

In accordance with the foregoing descriptions, the correlation factor $\text{Cor}_{x,y,SF}$ between the current code chip $M_{x,y,SF}$ and the preceding code chip $M_{x,y-1,SF}$ of the OVSF code $C_{SF,x}$ can be expressed as follows:

$$\text{Cor}_{x,y,SF} = M_{x,y-1,SF} \oplus M_{x,y,SF} \quad (2)$$

$$= \begin{cases} M_{[x/2],(y-1) \% (SF/2),SF/2} \oplus M_{[x/2],y \% (SF/2),SF/2} & y \neq SF/2 \\ M_{[x/2],(SF/2)-1,SF/2} \oplus b_k & y = SF/2 \end{cases}$$

where $b_k$ is the least significant bit of the binary representation of the code index x of the OVSF code $C_{SF,x}$.

The term $M_{[x/2],(SF/2)-1,SF/2}$ in the equation (2) can be further decomposed as follows:

$$M_{[x/2],(SF/2)-1,SF/2} = M_{[x/4],(SF/4)-1,SF/4} \oplus b_{k-1} \quad (3)$$

$$= M_{[x/8],(SF/8)-1,SF/8} \oplus b_{k-2} \oplus b_{k-1}$$

$$= M_{[x/16],(SF/16)-1,SF/16} \oplus b_{k-3} \oplus b_{k-2} \oplus b_{k-1}$$

$$\vdots$$

$$= b_1 \oplus b_2 \oplus \ldots \oplus b_{k-2} \oplus b_{k-1}$$

By substituting the equation (3) into the equation (2), the following equation is obtained:

$$\text{Cor}_{x,y,SF} = \quad (4)$$

$$\begin{cases} M_{x',y'-1,SF/2} \oplus M_{x',y',SF/2} & y \neq SF/2 \quad x' = [x/2], \; y' = y \% (SF/2) \\ b_1 \oplus b_2 \oplus \ldots \oplus b_{k-1} \oplus b_k & y = SF/2 \end{cases}$$

Similar to the term $M_{x,y-1,SF} \oplus M_{x,y,SF}$ in equation (2), the term $M_{x',y'-1,SF/2} \oplus M_{x',y',SF/2}$ in equation (4) can be further decomposed. As a result, the equation (4) can be rewritten as follows:

$$\text{Cor}_{x,y,SF} = \begin{cases} M_{[x'/2],(y'-1) \% (SF/4),SF/4} \oplus M_{[x'/2],y' \% (SF/4),SF/4} & y \neq SF/2 \wedge y' \neq SF/4 \\ b_1 \oplus b_2 \oplus \ldots \oplus b_{k-1} & y \neq SF/2 \wedge y' = SF/4 \\ b_1 \oplus b_2 \oplus \ldots \oplus b_{k-1} \oplus b_k & y = SF/2 \end{cases} \quad (5)$$

The criterion of the equation (5) can be rewritten as the following equation:

$$Cor_{x,y,SF} = \begin{cases} M_{[x'/2],(y'-1)\%(SF/4),SF/4} \oplus M_{[x'/2],y'\%(SF/4),SF/4} & y\%(SF/4) \neq 0 \\ b_1 \oplus b_2 \oplus \ldots \oplus b_{k-1} & y\%(SF/2) \neq 0 \wedge y\%(SF/4) = 0 \\ b_1 \oplus b_2 \oplus \ldots \oplus b_{k-1} \oplus b_k & y\%(SF/2) = 0 \end{cases} \quad (6)$$

The term $M_{[x'/2],(y'-1)\%(SF/4),SF/4} \oplus M_{[x'/2],y'\%(SF/4),SF/4}$ in equation (6) can be further decomposed according to the same decomposing rule of the term $M_{x,y-1,SF} \oplus M_{x,y,SF}$ in equation (2) and the term $M_{x',y'-1,SF/2} \oplus M_{x',y',SF/2}$ in equation (4), and the equation (6) can be totally expanded as follows:

$$Cor_{x,y,SF} = \begin{cases} b_1 & y\%2 \neq 0 \\ b_1 \oplus b_2 & y\%4 \neq 0 \wedge y\%2 = 0 \\ b_1 \oplus b_2 \oplus b_3 & y\%8 \neq 0 \wedge y\%4 = 0 \\ \vdots & \vdots \\ b_1 \oplus b_2 \oplus \ldots \oplus b_{k-2} & y\%(SF/4) \neq 0 \wedge y\%(SF/8) = 0 \\ b_1 \oplus b_2 \oplus \ldots \oplus b_{k-2} \oplus b_{k-1} & y\%(SF/2) \neq 0 \wedge y\%(SF/4) = 0 \\ b_1 \oplus b_2 \oplus \ldots \oplus b_{k-2} \oplus b_{k-1} \oplus b_k & y\%(SF/2) = 0 \end{cases} \quad (7)$$

From the equation (7), it can be appreciated that the correlation factor $Cor_{x,y,SF}$ between the current code chip $M_{x,y,SF}$ and the preceding code chip $M_{x,y-1,SF}$ of the OVSF code $C_{SF,x}$ can be determined based on the code index x ($=b_1 b_2 \ldots b_{k-1} b_k$) of the OVSF code $C_{SF,x}$ and the chip number y corresponding to the position of the current code chip $M_{x,y,SF}$ among code chips within the OVSF code $C_{SF,x}$.

Figure 2:
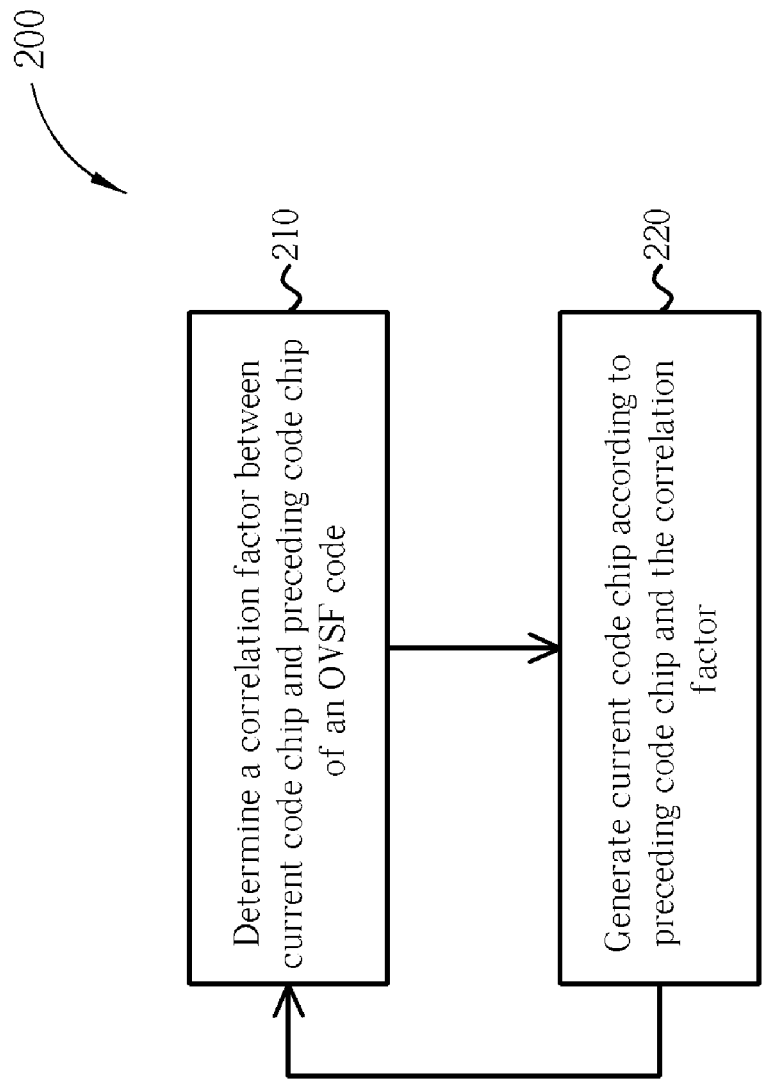
FIG. 2 is a flowchart illustrating a method for generating the code chips of an OVSF code according to an exemplary embodiment.

According to the foregoing descriptions, a method for generating the code chips of the OVSF code $C_{SF,x}$ can be illustrated with a flowchart 200 as shown in FIG. 2.

In step 210, a correlation factor $Cor_{x,y,SF}$ between a current code chip $M_{x,y,SF}$ and a preceding code chip $M_{x,y-1,SF}$ of the OVSF code $C_{SF,x}$ is determined according to the equation (7).

Subsequently, in step 220, the current code chip $M_{x,y,SF}$ can be generated according to the preceding code chip $M_{x,y-1,SF}$ and the correlation factor $Cor_{x,y,SF}$ according to the equation (1). It should be appreciated by those of ordinary skill in the art that the code chips of the OVSF code $C_{SF,x}$ can be sequentially generated by repeating the operations of steps 210 and 220.

Figure 3:
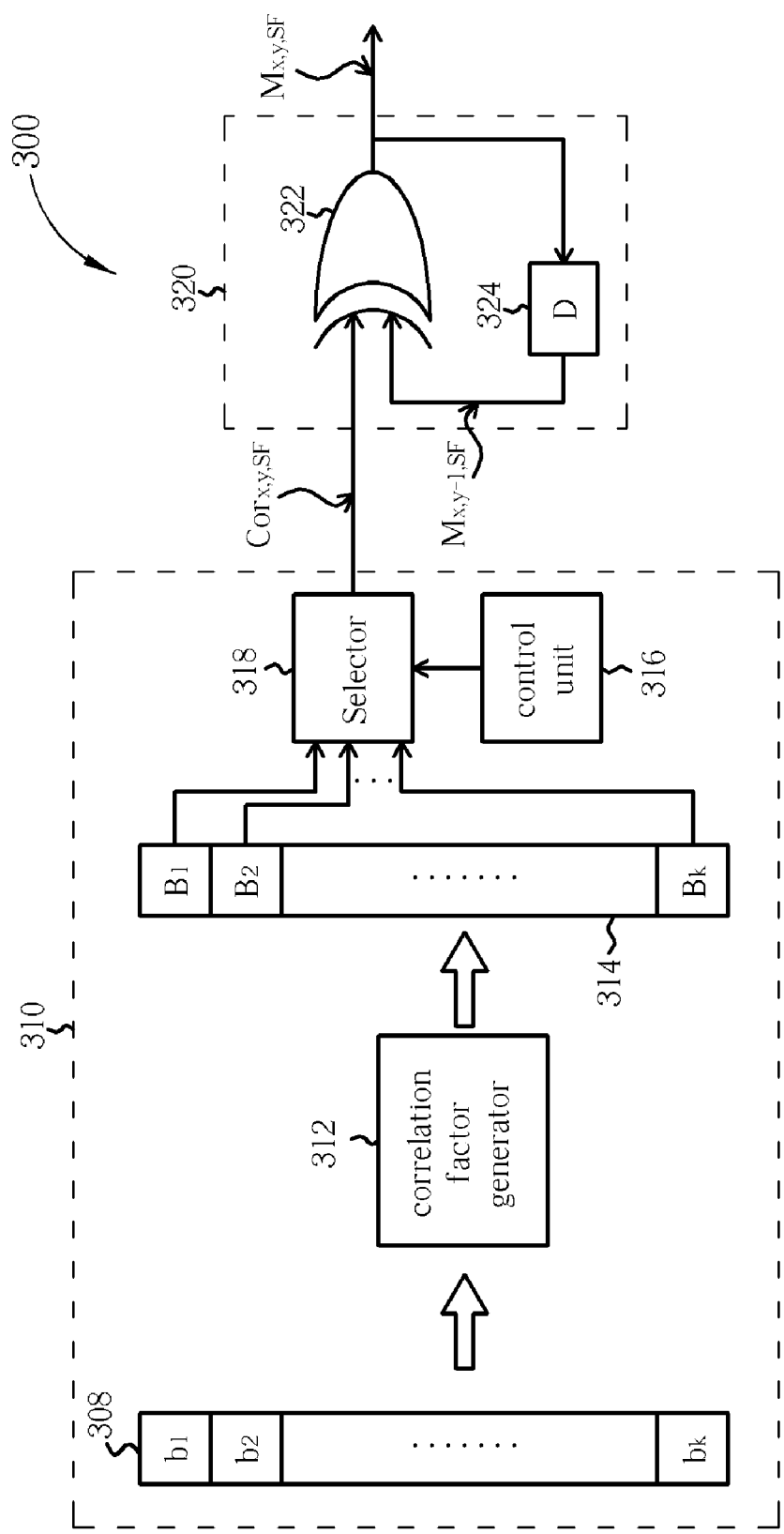
FIG. 3 is a block diagram of an OVSF code generator according to an exemplary embodiment.

Please refer to FIG. 3, which shows a block diagram of an OVSF code generator 300 according to an exemplary embodiment. The OVSF code generator 300 is utilized for implementing the OVSF code generating method illustrated in FIG. 2. As shown, the OVSF code generator 300 comprises a correlation factor decision device 310 and a code chip generator 320 coupled to the correlation factor decision device 310. The correlation factor decision device 310 is arranged for implementing the step 210 of the flowchart 200 and the code chip generator 320 is arranged for implementing the step 220 of the flowchart 200. In a preferred embodiment, the correlation factor decision device 310 comprises a code index register 308, a correlation factor generator 312, a correlation factor register 314, a control unit 316, and a selector 318. Further details of operations and implementations of the OVSF code generator 300 will be described hereinafter.

In the correlation factor decision device 310, the code index register 308 is arranged for storing the binary bits $b_1$, $b_2, \ldots,$ and $b_k$ of the code index x of the OVSF code $C_{SF,x}$ to be generated. The correlation factor generator 312 is arranged for generating a plurality of candidate correlation factors $B_1$, $B_2, \ldots,$ and $B_k$ according to the code index x stored in the code index register 308. In this embodiment, the correlation factor generator 312 generates each of the plurality of candidate correlation factors $B_i$ according to the following equation:

$$B_i = \begin{cases} b_i & i = 1 \\ B_{i-1} \oplus b_i & i = 2, 3, \ldots, k \end{cases} \quad (8)$$

Figure 4:
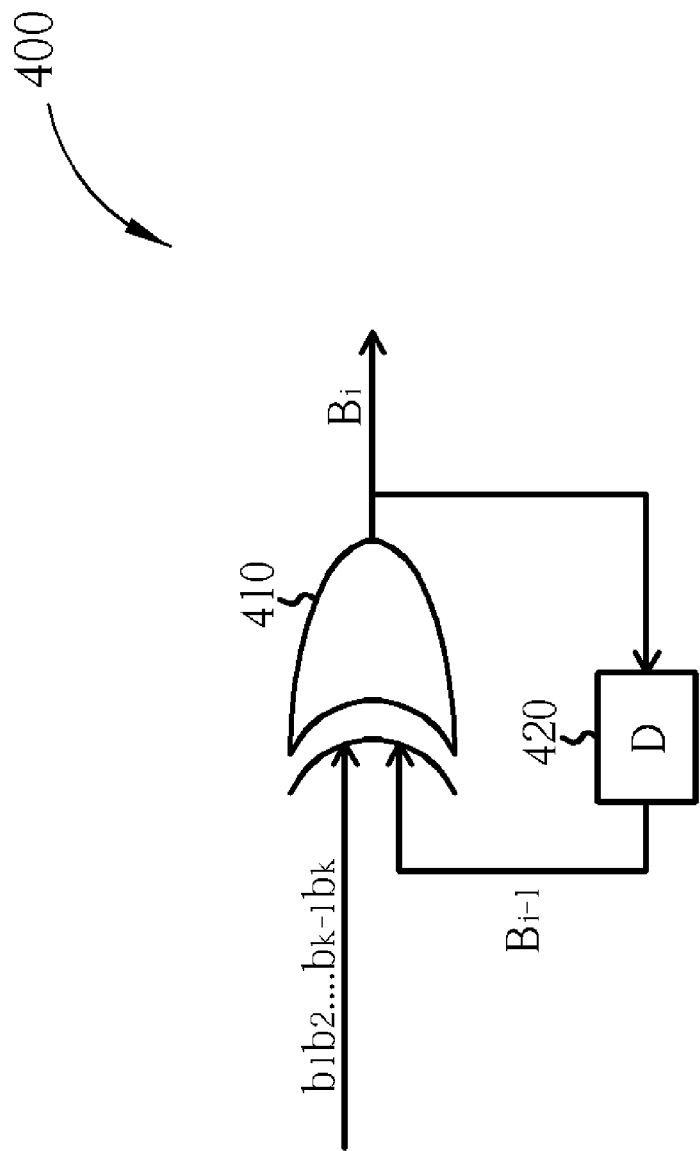
FIG. 4 is a block diagram of a correlation factor generator being an exemplary embodiment of the correlation factor generator of FIG. 3.

FIG. 4 shows a block diagram of a correlation factor generator 400 being an exemplary embodiment of the correlation factor generator 312 of FIG. 3. As shown, the correlation factor generator 400 comprises an XOR gate 410 and a delay unit 420 coupled to and disposed between an output terminal and an input terminal of the XOR gate 410. The delay unit 420 is arranged for delaying a candidate correlation factor $B_{i-1}$ generated from the XOR gate 410 and applying the delayed candidate correlation factor $B_{i-1}$ to the XOR gate 410. The XOR gate 410 then performs an XOR operation on the delayed candidate correlation factor $B_{i-1}$ and a corresponding code index bit $b_i$ to generate next candidate correlation factor $B_i$. Each candidate correlation factor $B_i$ generated from the correlation factor generator 312 is then stored in the correlation factor register 314. In practice, the correlation factor generator 312 may be implemented by a processor, such as a DSP of the system, capable of performing the XOR operation expressed in the equation (8).

According to the equation (8) and the equation (7), the following equation can be obtained:

$$Cor_{x,y,SF} = \begin{cases} B_1 & y\%2 \neq 0 \\ B_2 & y\%4 \neq 0 \wedge y\%2 = 0 \\ B_3 & y\%8 \neq 0 \wedge y\%4 = 0 \\ \vdots & \vdots \\ B_{k-2} & y\%(SF/4) \neq 0 \wedge y\%(SF/8) = 0 \\ B_{k-1} & y\%(SF/2) \neq 0 \wedge y\%(SF/4) = 0 \\ B_k & y\%(SF/2) = 0 \end{cases} \quad (9)$$

In accordance with the equation (9), it can be appreciated that the candidate correlation factor $B_i$ that should be selected as the correlation factor $Cor_{x,y,SF}$ between the current code chip $M_{x,y,SF}$ and the preceding code chip $M_{x,y-1,SF}$ of the OVSF code $C_{SF,x}$ is determined by the chip number y of the current code chip $M_{x,y,SF}$. The selection of the candidate correlation factor $B_i$ is determined by the position of the current code chip $M_{x,y,SF}$ among code chips within the OVSF code $C_{SF,x}$. Therefore, the control unit 316 of the correlation factor decision device 310 generates a control signal corresponding to the chip number y of the current code chip $M_{x,y,SF}$, and the selector 318 selects one of the plurality of candidate correlation factors $B_1, B_2, \ldots,$ and $B_k$ as the correlation factor $Cor_{x,y,SF}$ between the current code chip $M_{x,y,SF}$ and the preceding code chip $M_{x,y-1,SF}$ according to the control signal. In practical implementations, the selector 318 may be a k-to-1 multiplexer.

The selector 318 outputs the selected correlation factor $Cor_{x,y,SF}$ to the code chip generator 320. As in the foregoing descriptions, the code chip generator 320 is arranged for implementing the operations of step 220 of the flowchart 200, i.e. the code chip generator 320 generates the current code chip $M_{x,y,SF}$ according to the preceding code chip $M_{x,y-1,SF}$ and the correlation factor $Cor_{x,y,SF}$. In the embodiment shown in FIG. 3, the code chip generator 320 comprises a computing unit 322 and a delay unit 324 coupled to and disposed between an output terminal and an input terminal of the computing unit 322. The delay unit 324 is arranged for delaying the preceding code chip $M_{x,y-1,SF}$ generated from the computing unit 322 and applying the delayed preceding code chip $M_{x,y-1,SF}$ to the computing unit 322. The computing unit 322 then performs an XOR operation on the preceding code chip $M_{x,y-1,SF}$ and the correlation factor $Cor_{x,y,SF}$ to generate the current code chip $M_{x,y,SF}$. In practice, the computing unit 322 may be an XOR gate.

As mentioned previously, the equation (9) shows that the candidate correlation factor $B_i$ that should be selected as the correlation factor $Cor_{x,y,SF}$ is determined by the chip number y of the current code chip $M_{x,y,SF}$. In can be derived from the equation (9) that the candidate correlation factor $B_i$ is selected as the correlation factor $Cor_{x,y,SF}$ if the chip number y is the multiple of $2^{i-1}$ but not the multiple of $2^i$. For example, if the chip number y is the multiple of 2 (=$2^1$) but not the multiple of 4 (=$2^2$), the candidate correlation factor $B_2$ should be selected as the correlation factor $Cor_{x,y,SF}$; if y is the multiple of 4 (=$2^2$) but not the multiple of 8 (=$2^3$), the candidate correlation factor $B_3$ should be selected as the correlation factor $Cor_{x,y,SF}$; and if y is the multiple of $2^{k-2}$ (=SF/4) but not the multiple of $2^{k-1}$ (=SF/2), the candidate correlation factor $B_{k-1}$ should be selected as the correlation factor $Cor_{x,y,SF}$.

Figure 5:
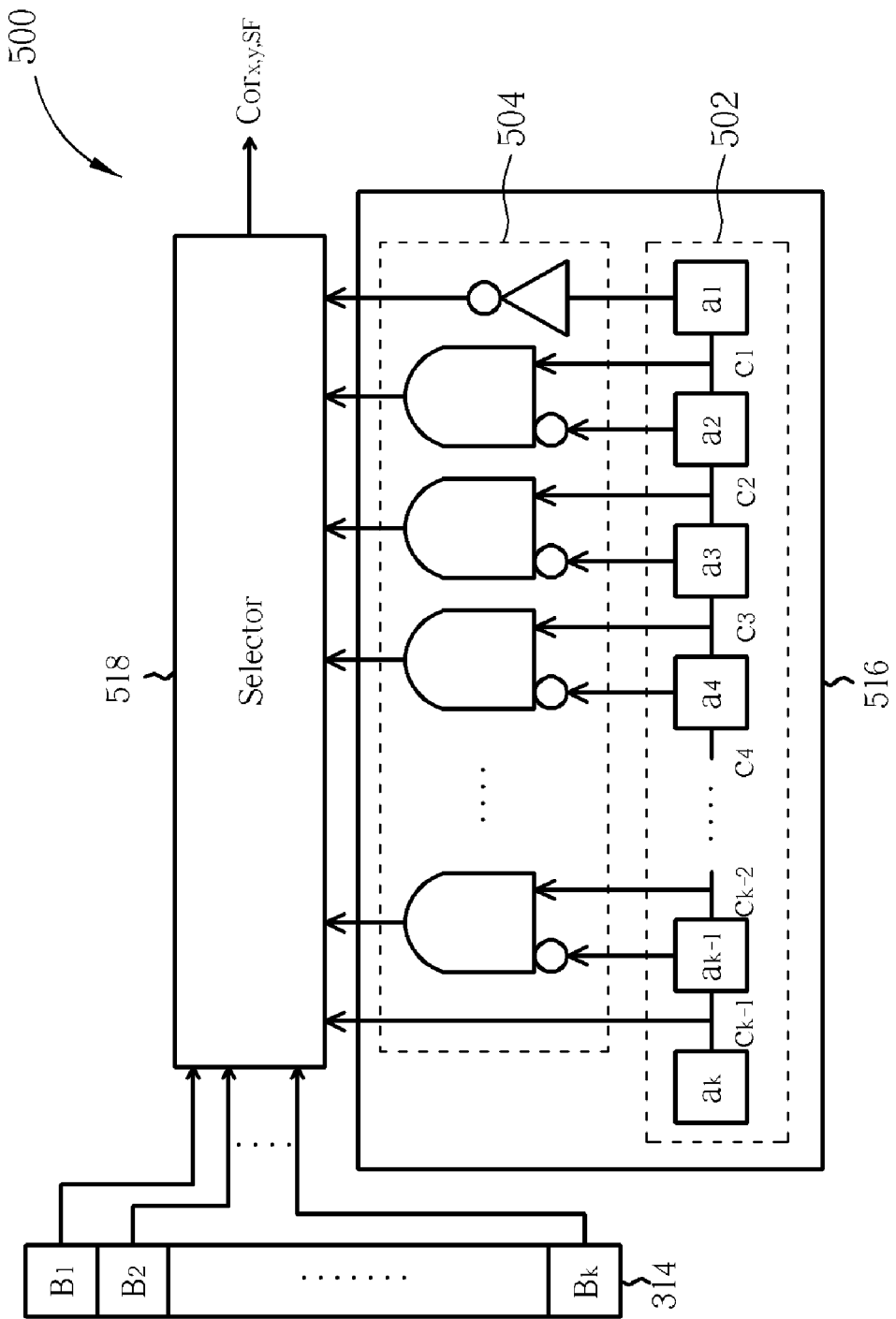
FIG. 5 is a block diagram of a simplified correlation factor decision device according to an exemplary embodiment.

In practice, the control unit 316 of the correlation factor decision device 310 may be implemented by a counter cooperating with a combination logic. For example, FIG. 5 shows a block diagram of a simplified correlation factor decision device 500 according to an exemplary embodiment. In the correlation factor decision device 500, a control unit 516 comprises a counter 502 for performing a counting operation and a combination logic 504 coupled to the counter 502 for generating a control signal according to counter bits and carry bits of the counter 502. The counter 502 of this embodiment has k counter bits $\{a_k, a_{k-1}, \ldots, a_2, a_1\}$ and k-1 internal carry bits $\{c_k, c_{k-1}, \ldots, c_2, c_1\}$. A selector 518 then selects one of the plurality of candidate correlation factors $B_1, B_2, \ldots,$ and $B_k$ as the correlation factor $Cor_{x,y,SF}$ between the current code chip $M_{x,y,SF}$ to be generated and the preceding code chip $M_{x,y-1,SF}$ according to the control signal from the control unit 516. In this embodiment, the code chip to be generated is indicated by the count value of the counter 502. For example, when the count value of the counter 502 equals to j, the j-th code chip of the OVSF code $C_{SF,x}$ is generated accordingly.

It can be appreciated that the selecting condition of the candidate correlation factor $B_i$ in the equation (9) can be replaced by the condition $\overline{a_i} \cdot c_{i-1}=1$. Therefore, the equation (9) can be rewritten as follows:

$$Cor_{x,y,SF} = \begin{cases} B_1 & \overline{a_1} = 1 \\ B_2 & \overline{a_2} \cdot c_1 = 1 \\ B_3 & \overline{a_3} \cdot c_2 = 1 \\ \vdots & \vdots \\ B_{k-2} & \overline{a_{k-2}} \cdot c_{k-3} = 1 \\ B_{k-1} & \overline{a_{k-1}} \cdot c_{k-2} = 1 \\ B_k & c_{k-1} = 1 \end{cases} \quad (10)$$

Since the correlation factor $Cor_{x,y,SF}$ is employed for generating the current code chip $M_{x,y,SF}$, it is preferable that the correlation factor $Cor_{x,y,SF}$ is ready when the count value of the counter 502 is equal to y-1. This restriction is included within the selecting condition of the candidate correlation factor $B_i$ in the equation (10). In this embodiment, the condition for selecting the candidate correlation factor $B_k$ is set to $c_{k-1}=1$ so that the control unit 516 goes back to the initial condition when the count value of the counter 502 is equal to 0. It should be appreciated by those of ordinary skill in the art that the foregoing control unit 316 or 516 can be implemented by a finite state machine in practice.

In practice, the registers 308 and 314 can be designed to have feasible storage capacity for supporting the generation of the OVSF code with the largest spreading factor in the system. For example, each of the registers 308 and 314 can be designed to have 8 bits storage capacity in order to support the generation of the OVSF code with a spreading factor 256.

It should be noted that the architecture of the disclosed OVSF code generator 300 is feasible for use in both the generation of OVSF code with the spreading factor SF and the generation of OVSF code with a smaller spreading factor SF'.

Figure 6:
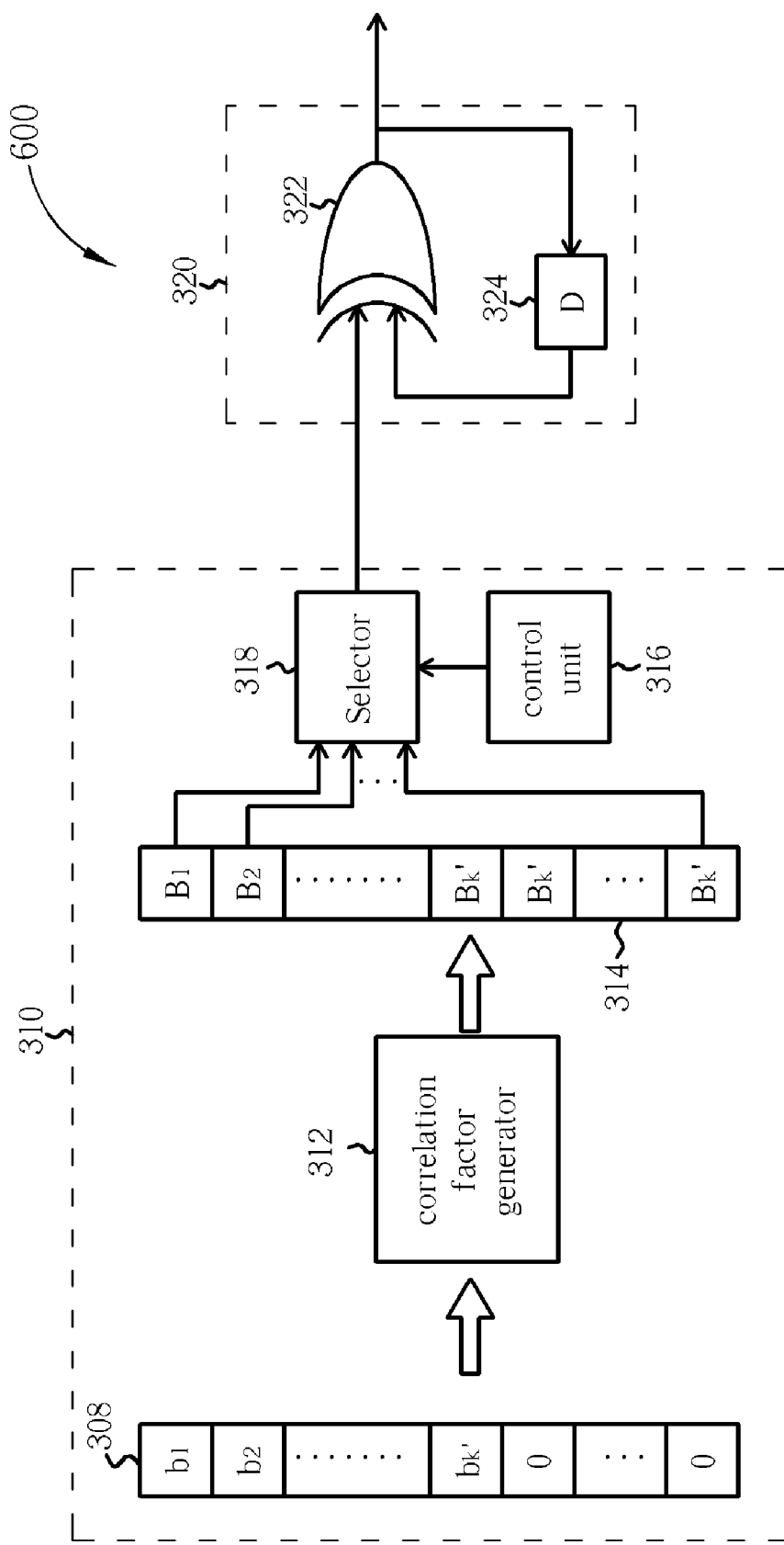
FIG. 6 shows an embodiment of the setting of the code index register of FIG. 3 when an OVSF code with a smaller spreading factor needs to be generated.

For example, FIG. 6 shows a schematic diagram 600 illustrating an embodiment of the setting of the code index register 308 when an OVSF code with a spreading factor SF' (=$2^{k'}$) needs to be generated. The OVSF code with the spreading factor SF' can be expressed as $C_{SF',x}$ where SF' is less than SF. A code index x' of the OVSF code $C_{SF',x}$ can be expressed in a binary form: x'=$b_1 b_2 \ldots b_{k'}$' where k' is less than k. To generate the code chips of the OVSF code $C_{SF',x}$, the correlation factor decision device 310 pads the fields following the LSB code index bit $b_{k'}$' of the code index register 308 with zeros as shown in FIG. 6. According to the equation (8), the candidate correlation factor $B_{k'}$' and the successive candidate correlation factors generated from the correlation factor generator 312 are identical.

It can be derived from the structure of the code tree 100 that when one zero is padded to the code index of a specific OVSF code, the resulting OVSF code is equivalent to repeat the specific OVSF code twice. Accordingly, when zeros are padded to the code index x' of the required OVSF code $C_{SF',x}$, then the resulting OVSF code generated from the OVSF code generator 300 is composed of repeated copies of the required OVSF code $C_{SF',x}$.

In contrast to the related art, the disclosed OVSF code generator does not require a memory of considerable capacity for storing all of the OVSF codes in the code tree 100. In addition, the architecture of the disclosed OVSF code generator is able to generate OVSF codes with different spreading factors thereby improving the utilization flexibility of the hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a desired code chip of an orthogonal code sequence, wherein the orthogonal code sequence is formed by a plurality of code chips, including the desired code chip and its adjacent code chip, comprising:
   providing a code index of the orthogonal code sequence;
   providing a chip index of the desired code chip;
   determining a correlation factor according to the code index and the chip index of the desired code chip; and
   generating the desired code chip according to the adjacent code chip and the correlation factor.

2. The method of claim 1, wherein the step of generating the desired code chip comprises:
   performing an XOR operation on the adjacent code chip and the correlation factor to generate the desired code chip.

3. The method of claim 1, wherein the step of determining the correlation factor determines the correlation factor according to the following equation:

$$\text{Cor}_{x,y,SF}$$

$$\begin{cases} b_1 & y \% 2 \neq 0 \\ b_1 \oplus b_2 & y \% 4 \neq 0 \wedge y \% 2 = 0 \\ b_1 \oplus b_2 \oplus b_3 & y \% 8 \neq 0 \wedge y \% 4 = 0 \\ \vdots & \vdots \\ b_1 \oplus b_2 \oplus \ldots \oplus b_{k-2} & y \% (SF/4) \neq 0 \wedge y \% (SF/8) = 0 \\ b_1 \oplus b_2 \oplus \ldots \oplus b_{k-2} \oplus b_{k-1} & y \% (SF/2) \neq 0 \wedge y \% (SF/4) = 0 \\ b_1 \oplus b_2 \oplus \ldots \oplus b_{k-2} \oplus b_{k-1} \oplus b_k & y \% (SF/2) = 0 \end{cases}$$

where $\text{Cor}_{x,y,SF}$ is the correlation factor; y is the chip index of the desired code chip where y=0, 1, 2, ..., SF-1; x is the code index of the orthogonal code sequence where x=0, 1, 2, ..., SF-1 and the binary representation of x is $b_1 b_2 \ldots b_{k-1} b_k$; and SF is a given spreading factor of the orthogonal code sequence in which $SF=2^k$.

4. The method of claim 1, wherein the orthogonal code sequence is OVSF code.

5. The method of claim 1, wherein the orthogonal code sequence is Hadamard code.

6. An apparatus for generating a desired code chip of an orthogonal code sequence, wherein the orthogonal code sequence is formed by a plurality of code chips, including the desired code chip and its adjacent code chip, comprising:
   a means for providing a code index of the orthogonal code sequence and for providing a chip index of the desired code chip;
   a correlation factor decision device for determining a correlation factor according to the code index and the chip index of the desired code chip; and
   a code chip generator, coupled to the correlation factor decision device for generating the desired code chip according to the adjacent code chip and the correlation factor.

7. The apparatus of claim 6, wherein the code chip generator comprises a computing unit for performing an XOR operation on the adjacent code chip and the correlation factor to generate the desired code chip.

8. The apparatus of claim 7, wherein the code chip generator further comprises:
   a delay unit coupled to and disposed between an output terminal and an input terminal of the computing unit for delaying the adjacent code chip and applying the delayed adjacent code chip to the computing unit.

9. The apparatus of claim 7, wherein the correlation factor decision device comprises:
   a correlation factor generator for generating a plurality of candidate correlation factors according to the code index of the orthogonal code sequence;
   a control unit for generating a control signal corresponding to the chip index of the desired code chip; and
   a selector coupled to the correlation factor generator and the control unit for selecting one of the plurality of candidate correlation factors as the correlation factor according to the control signal.

10. The apparatus of claim 9, wherein the selector is a multiplexer.

11. The apparatus of claim 9, wherein the control unit is a state machine.

12. The apparatus of claim 9, wherein the control unit comprises:
   a counter for performing a counting operation; and
   a combination logic coupled to the counter for generating the control signal according to counter bits and carry bits of the counter.

13. The apparatus of claim 9, wherein the correlation factor generator is a processor.

14. The apparatus of claim 6, wherein the correlation factor decision device determines the correlation factor according to the following equation:

$$\text{Cor}_{x,y,SF}$$

$$\begin{cases} b_1 & y \% 2 \neq 0 \\ b_1 \oplus b_2 & y \% 4 \neq 0 \wedge y \% 2 = 0 \\ b_1 \oplus b_2 \oplus b_3 & y \% 8 \neq 0 \wedge y \% 4 = 0 \\ \vdots & \vdots \\ b_1 \oplus b_2 \oplus \ldots \oplus b_{k-2} & y \% (SF/4) \neq 0 \wedge y \% (SF/8) = 0 \\ b_1 \oplus b_2 \oplus \ldots \oplus b_{k-2} \oplus b_{k-1} & y \% (SF/2) \neq 0 \wedge y \% (SF/4) = 0 \\ b_1 \oplus b_2 \oplus \ldots \oplus b_{k-2} \oplus b_{k-1} \oplus b_k & y \% (SF/2) = 0 \end{cases}$$

where $\text{Cor}_{x,y,SF}$ is the correlation factor; y is the chip index of the desired code chip sequence where y=0, 1, 2, ..., SF-1; x is the code index of the orthogonal code where x=0, 1, 2, ..., SF-1 and the binary representation of x is $b_1 b_2 \ldots b_{k-1} b_k$; and SF is a given spreading factor of the orthogonal code sequence in which $SF=2^k$.

15. The apparatus of claim 6, wherein the orthogonal code sequence is OVSF code.

16. The apparatus of claim 6, wherein the orthogonal code sequence is Hadamard code.

17. A method for generating a desired code chip of an OVSF code sequence, wherein the OVSF code sequence is formed by a plurality of code chips, including the desired code chip and its adjacent code chip, comprising:
   providing a code index of the OVSF code sequence;
   providing a chip index of the desired code chip;
   determining a correlation factor according to the code index and the chip index of the desired code chip; and
   generating the desired code chip according to the adjacent code chip and the correlation factor, wherein the step of determining the correlation factor determines the correlation factor according to the following equation:

$$\text{Cor}_{x,y,SF} \begin{cases} b_1 & y \% 2 \neq 0 \\ b_1 \oplus b_2 & y \% 4 \neq 0 \wedge y \% 2 = 0 \\ b_1 \oplus b_2 \oplus b_3 & y \% 8 \neq 0 \wedge y \% 4 = 0 \\ \vdots & \vdots \\ b_1 \oplus b_2 \oplus \ldots \oplus b_{k-2} & y \% (SF/4) \neq 0 \wedge y \% (SF/8) = 0 \\ b_1 \oplus b_2 \oplus \ldots \oplus b_{k-2} \oplus b_{k-1} & y \% (SF/2) \neq 0 \wedge y \% (SF/4) = 0 \\ b_1 \oplus b_2 \oplus \ldots \oplus b_{k-2} \oplus b_{k-1} \oplus b_k & y \% (SF/2) = 0 \end{cases}$$

where $\text{Cor}_{x,y,SF}$ is the correlation factor; y is the chip index of the desired code chip where y=0, 1, 2, ..., SF-1; x is the code index of the OVSF code sequence where x=0, 1, 2, ..., SF-1 and the binary representation of x is $b_1 b_2 \ldots b_{k-1} b_k$; and SF is a given spreading factor of the OVSF code sequence in which $SF=2^k$.

18. An apparatus for generating a desired code chip of an OVSF code sequence, wherein the OVSF code sequence is formed by a plurality of code chips, including the desired code chip and its adjacent code chip, comprising:

a means for providing a code index of the OVSF code sequence and for providing a chip index of the desired code chip;

a correlation factor decision device for determining a correlation factor according to the code index and the chip index of the desired code chip; and a code chip generator, coupled to the correlation factor decision device for generating the desired code chip according to the adjacent code chip and the correlation factor, wherein the correlation factor decision device determines the correlation factor according to the following equation:

$$\text{Cor}_{x,y,SF} \begin{cases} b_1 & y \% 2 \neq 0 \\ b_1 \oplus b_2 & y \% 4 \neq 0 \wedge y \% 2 = 0 \\ b_1 \oplus b_2 \oplus b_3 & y \% 8 \neq 0 \wedge y \% 4 = 0 \\ \vdots & \vdots \\ b_1 \oplus b_2 \oplus \ldots \oplus b_{k-2} & y \% (SF/4) \neq 0 \wedge y \% (SF/8) = 0 \\ b_1 \oplus b_2 \oplus \ldots \oplus b_{k-2} \oplus b_{k-1} & y \% (SF/2) \neq 0 \wedge y \% (SF/4) = 0 \\ b_1 \oplus b_2 \oplus \ldots \oplus b_{k-2} \oplus b_{k-1} \oplus b_k & y \% (SF/2) = 0 \end{cases}$$

where $\text{Cor}_{x,y,SF}$ is the correlation factor; y is the chip index of the desired code chip where y=0, 1, 2, ..., SF-1; x is the code index of the OVSF code sequence where x=0, 1, 2, ..., SF-1 and the binary representation of x is $b_1 b_2 \ldots b_{k-1} b_k$; and SF is a given spreading factor of the orthogonal code sequence in which $SF=2^k$.

* * * * *